United States Patent
Chan et al.

(10) Patent No.: US 6,184,908 B1
(45) Date of Patent: Feb. 6, 2001

(54) METHOD AND APPARATUS FOR CO-PROCESSING VIDEO GRAPHICS DATA

(75) Inventors: Jason CK Chan, Scarborough; Milivoje Aleksic, Richmond Hill; Antonio Asaro, Scarborough; James Doyle, Thornhill; Indra Laksono, Richmond Hill, all of (CA)

(73) Assignee: ATI Technologies, Inc., Unionville (CA)

( * ) Notice: Under 35 U.S.C. 154(b), the term of this patent shall be extended for 0 days.

(21) Appl. No.: 09/067,512

(22) Filed: Apr. 27, 1998

(51) Int. Cl.$^7$ .............................. G06F 15/00; G06T 1/00
(52) U.S. Cl. ........................ 345/522; 345/511; 345/512
(58) Field of Search .................................. 345/501–503, 345/511, 507–509, 513, 515, 516, 522, 512

(56) References Cited

U.S. PATENT DOCUMENTS

| | | | |
|---|---|---|---|
| 5,138,561 | * 8/1992 | Crowe | 395/103 |
| 5,485,559 | * 1/1996 | Sakaibara et al. | 395/133 |
| 5,794,016 | * 8/1998 | Kelleher | 345/505 |
| 5,796,413 | * 8/1998 | Shipp et al. | 345/522 |
| 5,861,893 | * 1/1999 | Sturgess | 345/525 |
| 5,999,196 | * 12/1999 | Storm et al. | 345/506 |

* cited by examiner

*Primary Examiner*—Kee M. Tung
(74) *Attorney, Agent, or Firm*—Markison & Reckamp, P.C.

(57) ABSTRACT

To minimize CPU processing requirements for preparing and transferring data to a graphics processor, a graphics command processor is provided that supports application-level commands and references to the data associated with these commands. The graphics command processor parses the application command and data reference parameters, and subsequently fetches the appropriate graphics data from memory directly, without requiring additional CPU resources. To optimize performance, the graphics command processor fetches the data in parallel with the parsing and processing of the application commands from the CPU. The graphics command processor also includes a processing unit that converts the data from the format used by the application program to the format used for rendering. The graphics command processor creates the commands and data sequences used by a graphics engine to render each object of the image. Because the graphics command processor is closely coupled with the graphics engine, a number of efficiency can be gained, particularly with regard to the transfer of related data items. The processing of the primitive graphic command and data sequences by the graphics engine is asynchronous with the receipt of subsequent commands from the CPU and the fetching of subsequent data associated with the commands from the memory. In this manner, the latency associated with the conventional sequential processing of graphics data is minimized.

17 Claims, 6 Drawing Sheets

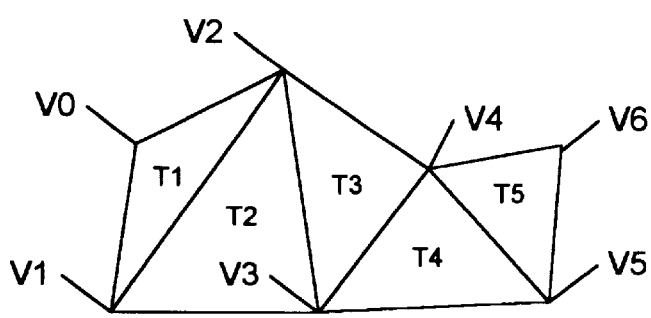
FIG. 5A
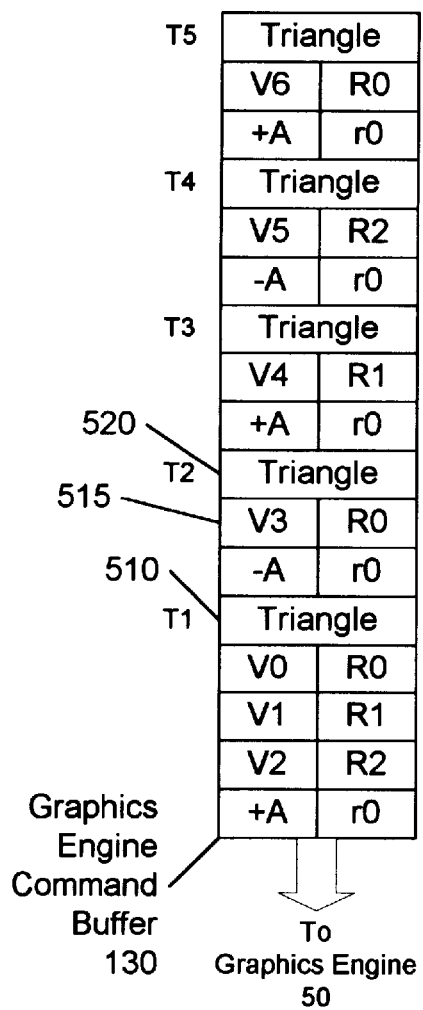
FIG. 5B
FIG. 5C

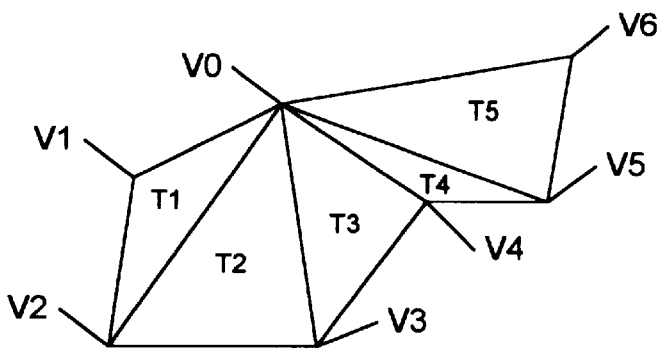
FIG. 6A
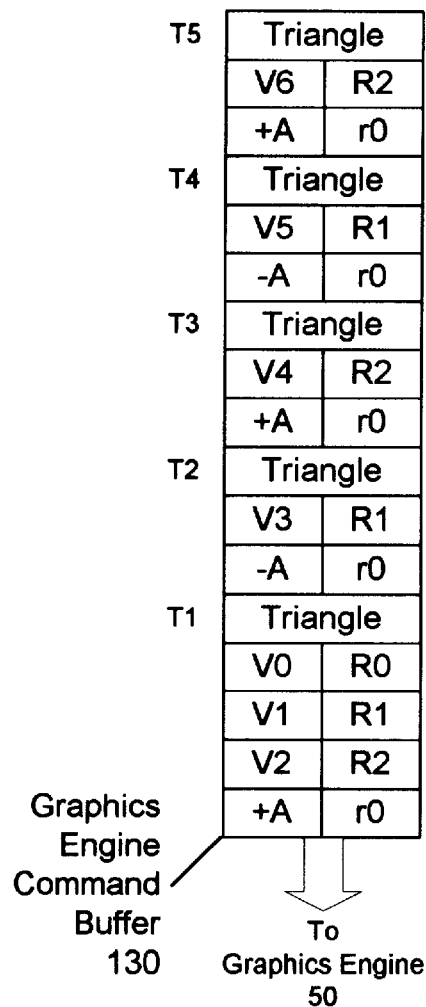
FIG. 6C
|    | R0 | R1 | R2 | r0 |
|----|----|----|----|----|
| T1 | V0 | V1 | V2 | +  |
| T2 | V0 | V3 | V2 | −  |
| T3 | V0 | V3 | V4 | +  |
| T4 | V0 | V5 | V4 | −  |
| T5 | V0 | V5 | V6 | +  |
FIG. 6B

METHOD AND APPARATUS FOR CO-PROCESSING VIDEO GRAPHICS DATA

TECHNICAL FIELD OF THE INVENTION

The present invention relates generally to computers system and more particularly to co-processing video graphics data within computer systems.

BACKGROUND OF THE INVENTION

A computer is known to include a central processing unit, system memory, video graphics circuitry, audio processing circuitry, and peripheral ports. In such a computer, the central processing unit functions as a host processor while the video graphics circuit functions as a loosely coupled co-processor. In general, the host processor executes application programs and, during execution, calls upon the co-processor to execute its particular function. For example, if the host central processing unit requires a drawing operation to be done, it requests, via a command through a command delivery system, the video graphics processor to perform the drawing function.

Graphics processors, in general, are designed to efficiently render graphic images consisting of a mosaic of triangular areas. The graphics processor receives the characteristics of the image at the vertices of the triangle, and thereafter fills in the triangular area by an interpolation of these characteristics. Conventionally, the CPU prepares the data for execution by the graphics processor and then submits a command and the associated data to the processor for execution. The commands and data generally consist of a series of "draw-triangle" commands, followed by, or preceded by, the data associated with each vertex of the triangle. In this manner, the CPU is able to create and manipulate complex images without computing the details associated with each picture element (pixel) of the displayed image.

During the execution of an application program, the CPU stores the graphics information that is generated by the application program in memory. For efficient programming and execution of the application program, this graphics information is not necessarily stored in memory in the same order or format as required by the graphics processor. There may be information stored in memory that is required by the application program, but irrelevant to the graphics processor, or unnecessary for a particular graphics command. For example, a user may request a display of an image in draft form, without texturing or other realism effects, to speed the process while editing the image. In this example, the CPU formulates the appropriate draw-triangle command and provides the graphics processor only the information required to render the image in the draft form. This process requires CPU processing time, as well as additional memory, to extract and prepare the data that is to be transferred to the graphics processor.

In preparing the data for execution by the graphics processor, the CPU often transforms the data from the format suitable for processing by the application program into the format suitable for processing by the graphics processor; for example, from a floating point format to an integer format. Because such conversion is commonly required, software drivers are generally provided to perform these conversions. The CPU provides the data in a first format to the software driver, receives the data in a second format, then formulates the command and data sequence required by the graphics processor. This sequence of data processing introduces latencies in the overall processing of graphics information as one process waits for another process to be completed. It also introduces a significant overhead in CPU processing, because the CPU must either wait for each process to complete its task, or provide for a polling or interrupt scheme to allow multiple processes to operate in parallel while still maintaining the required sequential ordering of the data processing.

Therefore, a need exists for a method and apparatus for processing video graphics data that minimizes the latencies associated with graphics command and data processing, minimizes the processing and memory requirements associated with the transfer of information to the graphics processor, and also minimizes the overhead burden on the CPU.

BRIEF DESCRIPTION OF THE DRAWING

FIGS. 5A–5C illustrate an example of a rendering of a strip of adjacent triangles in accordance with this invention.

FIGS. 6A–6C illustrate an example of a rendering of a fan of adjacent triangles in accordance with this invention.

DETAILED DESCRIPTION OF A PREFERRED EMBODIMENT

Generally, the present invention provides a method and apparatus for co-processing video graphics data. To minimize the CPU processing requirements for transferring the data to a graphics processor, a graphics command processor is provided that supports application-level commands and references to the data associated with these commands. The graphics command processor parses the application command and data reference parameters, and subsequently fetches the appropriate graphics data from memory directly, without requiring additional CPU resources. The graphics command processor supports higher level commands from the CPU, allowing, for example, the rendering of blocks of triangles via a single command, thereby reducing the number of commands the CPU must create and coordinate in response to an application program graphics request. To optimize performance, the graphics command processor fetches the data in parallel with the parsing and processing of the application commands from the CPU. The graphics command processor also includes a processing unit that converts the data from the format used by the application program to the format used for rendering. The graphics command processor creates and stores the primitive graphics rendering commands and data sequences used to render each object of the image, and a graphics engine processes these render commands and data sequences to render the image. Because the graphics command processor is closely coupled with the graphics engine, a number of efficiency can be gained, particularly with regard to the transfer of related data items. The processing of the primitive graphic command and data sequences by the graphics engine is asynchronous with the receipt of subsequent commands from the CPU and the fetching of subsequent data associated with the commands from the memory. In this manner, the latency associated with the conventional sequential processing of graphics data is minimized. Thus, the CPU can continuously process the application program to provide data elements to the memory, and the graphics command processor retrieves them and processes them at its own rate. By breaking the dependency between the CPU and the processing of graphics data for rendering, the host CPU and graphics command processor operate in a much more concurrent manner than in previous embodiments.

Figure 1:
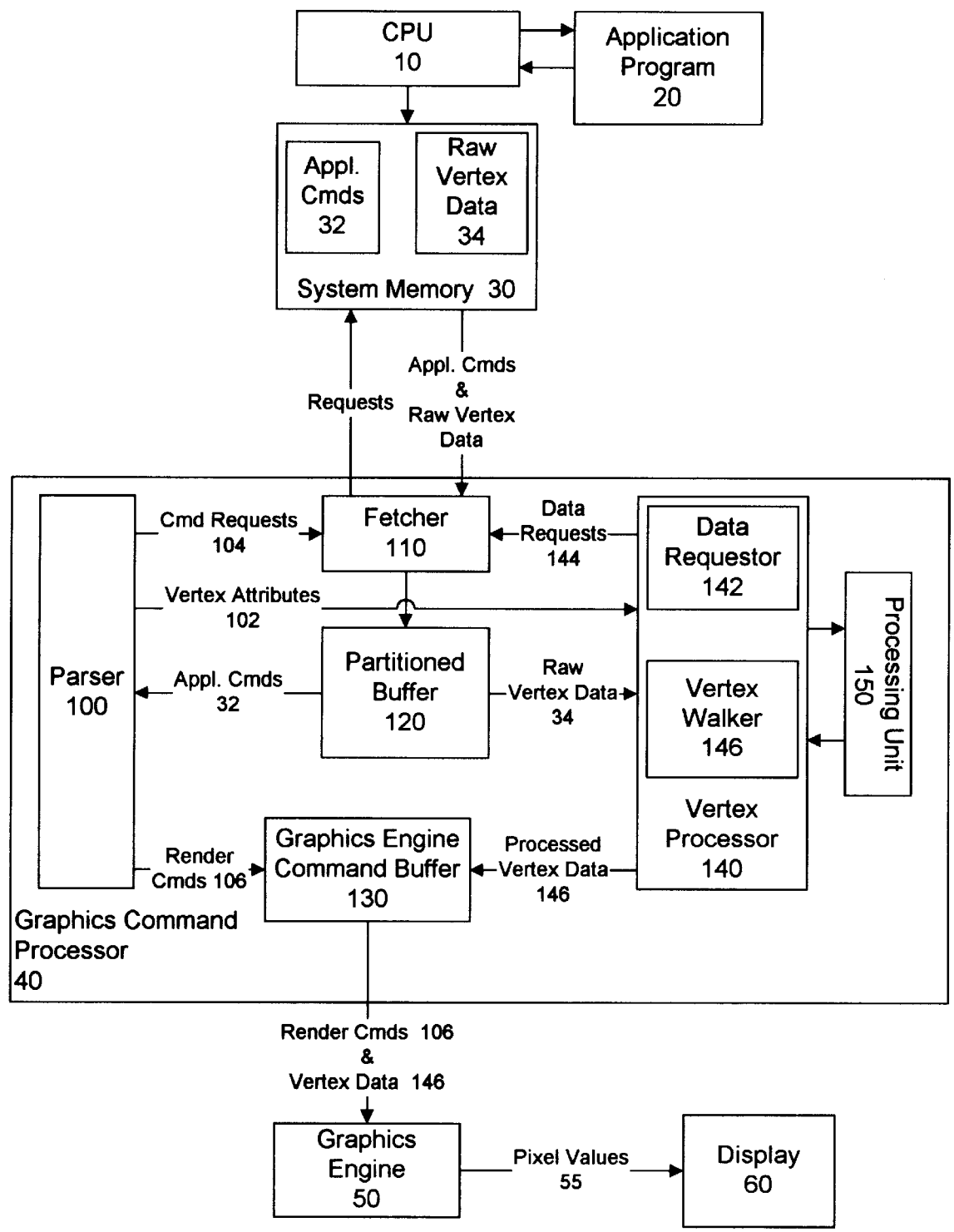
FIG. 1 illustrates a block diagram of an embodiment of a graphics processing system in accordance with this invention.

FIG. 1 illustrates an embodiment of a graphics command processor 40 in accordance with this invention. Shown in FIG. 1 is a CPU 10 that processes an application program 20 and stores application commands 32 and raw vertex data 34 in a memory 30. The memory 30 may be system memory, local memory to the host processor, local memory to the graphics processor, or a combination thereof. The memory may be constructed of random access memory, floppy disk memory, hard disk memory, magnetic tape memory, CD memory, DVD memory, and/or any device that stores digital information. The application commands 32 are the graphic commands formulated by the CPU 10 to produce the graphic image resulting from the application program 20, typically in response to a user request or set of requests (not shown). These application commands 32 are processed by the graphics command processor 40 to produce render commands 106 and vertex data 146 for a rendering of the graphic image by a graphics engine 50 upon a display 60. The graphics command processor 40 may be a micro-processor, micro-controller, digital signal processor, processor on a video graphics card, and/or any other device that manipulates digital information based on programming instructions.

The graphics command processor 40 includes a fetcher 110 that fetches the application commands 32 and raw vertex data 34 from the memory 30. A parser 100 processes the application commands 32 to produce render commands 106 that are processed by the graphics engine 50, and vertex attributes 102 that are processed by a vertex processor 140. The parser 100 also issues command requests 104 to the fetcher to initiate the fetching of subsequent application commands 32. In response to the vertex attributes 102, the vertex processor 140 issues data requests 144 to the fetcher 110 to initiate the fetching of raw vertex data 34 from the memory 30. After the requested raw vertex data 34 is received in the buffer 120, the vertex processor 140 processes the raw vertex data 34 to produce processed vertex data 146 associated with the render commands 106 produced by the parser 100. A processing unit 150 performs data conversions and numerical calculations as required to facilitate the processing of the raw vertex data 34. The render commands 106 and processed vertex data 146 are stored in a graphics engine command buffer 130.

Figure 2:
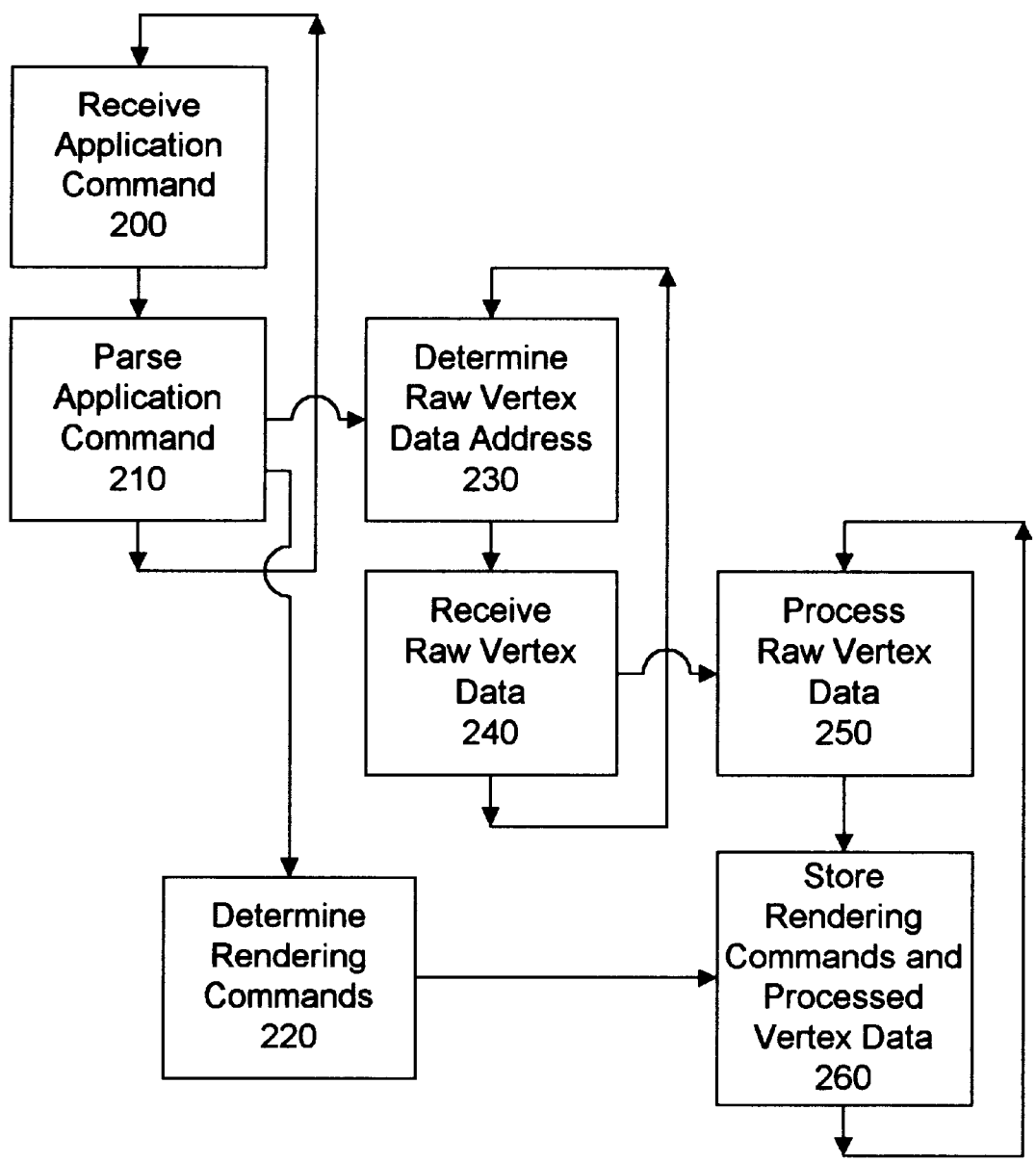
FIG. 2 illustrates a flow diagram of an embodiment of a graphics command processor in accordance with this invention.

The operation of the graphics command processor 40 is illustrated by a flow diagram in FIG. 2. To minimize latency, the graphics command processor 40 executes three concurrent processes: the process (200–210) of receiving and parsing application commands; the process (230–240) of obtaining raw vertex data; and the process (220, 250–260) of creating rendering commands and processed vertex data. At 200, an application command 32 is received. As discussed above, the parser 100 requests each subsequent application command 32 from memory 30 via the fetcher 110. Alternatively, the CPU 10 could initiate a request to transfer each subsequent command 32.

At 210, the parser 100 parses the application command 32. The application command 32 contains a graphics command and either the data associated with the graphics command or a reference to where the data associated with the graphics command is located in memory 30. Based on the application command 32, the parser 100 determines the set of rendering commands 106 required to effect the graphics command, at 220, and also determines the vertex attributes 102 for associating vertex data with each of the rendering commands. Based upon the vertex attributes 102, the vertex processor 140 determines, at 230, the address of selected raw vertex data 34 that is in memory 30. At 240, the vertex processor issues data requests 144 to the fetcher 110, which in turn fetches the selected raw vertex data 34 from the memory 30. If the application command 32 contains the raw vertex data associated with the graphics command, rather than a reference to the location of the data, the parser 100 passes the raw vertex data to the vertex processor 140 as part of the vertex attributes 102, and blocks 230 and 240 are bypassed.

The application commands 32 are structured to allow for alternative methods of determining the address of the raw vertex data 34. In a first method, the application command 32 contains an offset address, typically the address of the first vertex, and the number of vertices associated with the application command 32. The address of each vertex is determined by sequentially adding the number of data elements that constitute each vertex, starting at the offset address. The number of data elements that constitute each vertex may be predefined, it may be implied by the type of application command 32, or it may be explicitly contained in the application command 32. The parser 100 provides the offset, number of vertices, and number of data elements per vertex to the vertex processor 140 as part of the vertex attributes 102. The parser 100 may also include a parameter that identifies the number of data elements that need to be read for each vertex to effect the rendering command 106. That is, for example, each vertex may contain a dozen data elements, but the rendering command for a draft display may only require four of these data elements. In this example, the vertex processor 140 uses the offset and the number of data elements per vertex (12) to determine the each vertex address, and requests the read of the required number of data elements (4) from each vertex address.

In another method of raw data address determination, the application command 32 contains an offset address and a list of indices from this offset at which to obtain each vertex. In this method, the vertices associated with the application command 32 need not be equally spaced in memory, as in the first method. As would be evident to one of ordinary skill in the art, the use of indices from an offset is an abbreviated means of identifying each vertex address explicitly; other techniques of identifying the address of equally or unequally spaced entities in memory are common in the art.

In accordance with one aspect of this invention, the fetcher 110 places both the application commands 32 and the raw vertex data 34 into a partitioned buffer 120. The buffer 120 is partitioned into a first logical buffer and a second logical buffer. The application commands 32 are placed in the first logical buffer, and the raw vertex data is placed in the second logical buffer. Depending upon the sequence of application commands and referenced raw vertex data, the size of each of these logical partitions of the buffer 120 is dynamically adjusted. That is, for example, the first logical buffer that is allocated for containing the application commands 32 will be adjusted in dependence upon the latency associated with the retrieval of raw vertex data 34. In this manner, subsequent application commands 32 can be received and processed while the prior referenced raw vertex data 34 is transferred from the memory 30 to the partitioned buffer 120. By dynamically adjusting the logical partitioning of the buffer 120, the delays associated with the receipt of raw vertex data 34 will have minimal effect on the receipt and processing of application commands 32.

The vertex processor 140 processes the raw vertex data 34, at 250 of FIG. 2, to produce processed vertex data 146. This processed data 146 is stored in a graphics engine command buffer 130, along with the rendering command 106 associated with this data, at 260. The processing of the raw vertex data 34 includes any format conversion required, for example, from floating point to integer or fixed point formats. The required conversion for each of the data elements in the raw vertex data may be predefined, or it may be based on a set of format parameters determined by the parser 100. The parser determines the format based upon a type of application command 32, termed a "format" command, that specifies the format of the raw vertex data, and communicates this information to the vertex processor 140 via the vertex attributes 102. Thus, by providing a format command for the graphics command processor 40 to effect the formatting of select data elements within the raw vertex data 34, the CPU 10 is relieved of the task of formatting these data elements for processing by the graphics engine 50.

Note that, as shown in FIG. 2, the processes 200–210, 230–240, and 250–260 are loosely coupled processing loops. When, for example, the parser 100 parses the application command 32 and passes the necessary vertex attributes 102 to the vertex processor 140, at 210, it loops back to process step 200 to receive the next application command, independent of the fetching of raw vertex data by the vertex processor 140. Similarly, the vertex processor 240 includes a data requester 142 for executing the loop 230–240 to obtain the raw vertex data 34, independent of the vertex walker 146 that processes, via the loop 250–260, the raw vertex data 34. By providing these loosely coupled processing loops, the latency caused by sequential processing is minimized.

The processing of the raw vertex data 34, at 250, may include the "culling" of data and commands, based upon whether the results of a particular rendering command will be visible. That is, for example, in a three dimensional rendering, the application command 32 may call for the rendering of a series of triangles, but some of the triangles may be completely obscured by other objects in the image, based upon their relative distances (z-axis parameter) from the viewer. Or, the application command 32 may call for the rendering of a solid object from a particular viewpoint. In such a scenario, the surfaces that are oriented away from the viewpoint are those that are at the "rear" of the object relative to the viewpoint, and will not be visible from that viewpoint. By processing the raw vertex data to determine the visibility of each surface relative to the current viewpoint, the vertex processor 140 can reduce the number of rendering commands and associated data that are submitted to the graphics engine 50.

Figure 3:
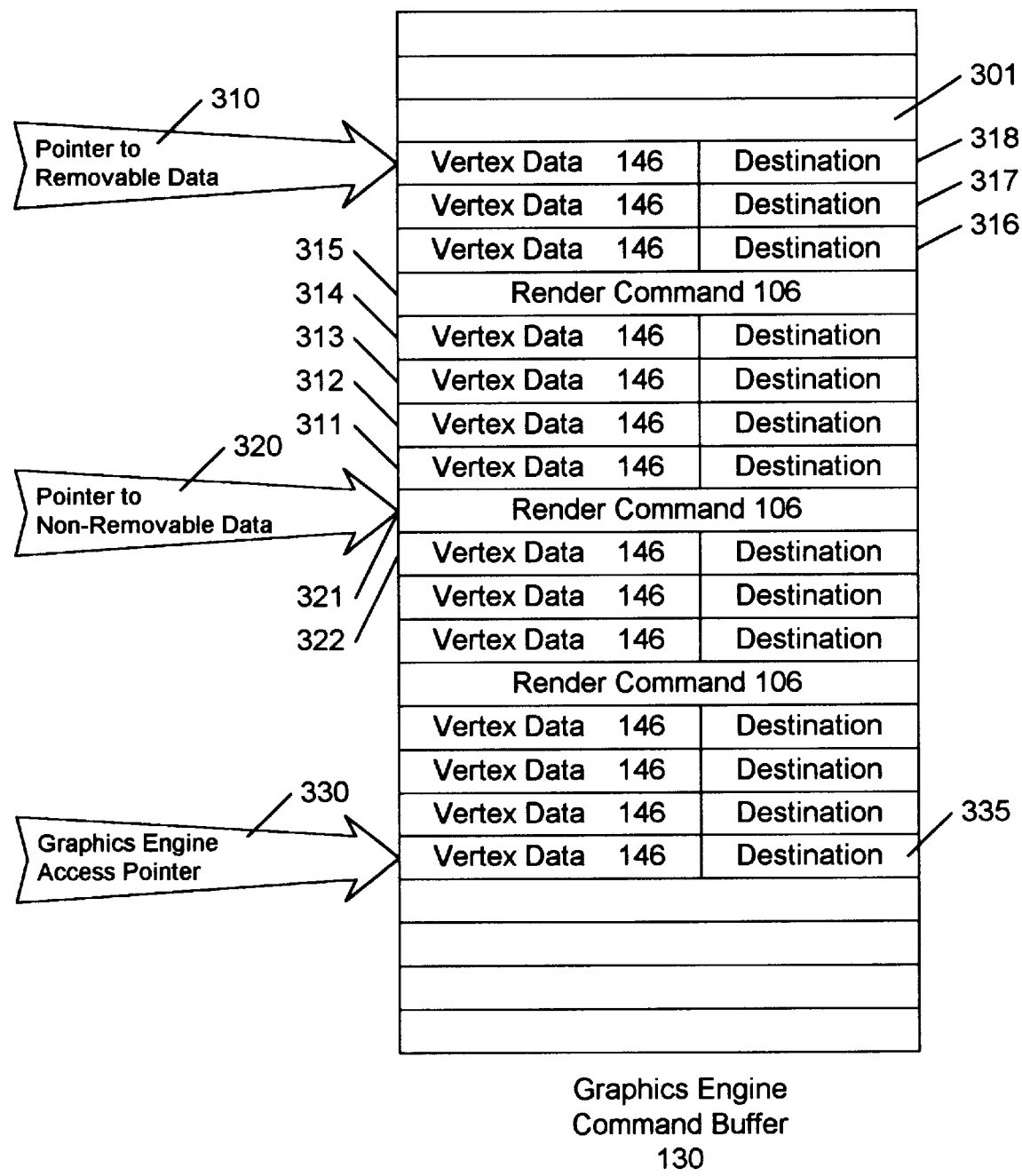
FIG. 3 illustrates an example sequence of rendering commands and data within a graphics engine command buffer in accordance with this invention.

Note that in many instances, the visibility of a surface may not be determined until after all the raw vertex data associated with a rendering command is processed. In accordance with one aspect of this invention, the graphics engine command buffer 130 contains three pointers 310, 320, and 330, illustrated in FIG. 3. The graphics engine command buffer 130 contains render commands 106 and vertex data 146; associated with each vertex data 146 is, optionally, a destination identifier 335, indicating where the vertex data 146 is to be loaded into the graphics engine 50, discussed hereafter. The buffer 130 is typically a FIFO, arranged as a circular buffer. The pointer 310 identifies the location in the buffer 130 that has been most recently written to, and is used to identify the next available location for adding data or commands. The pointer 330 identifies the location in the buffer 130 at which the graphics engine 50 accesses data or commands for processing. An additional pointer 320 identifies a logical end of the buffer 130; this logical end, at 321, is the last data or command entry that is to be processed by the graphics engine 50. The remaining entries, 311 through 318, are entries that have been added by the vertex processor 140 or the parser 100, but which have not yet been defined as entries that are to be processed by the graphics engine 50. These entries may be, for example, commands and data associated with rendering an object that may or may not be visible from the current viewpoint. When it is determined that the entries between pointer 320 and pointer 310 are to be rendered by the graphics engine 50, the pointer 320 is set equal to pointer 310. When it is determined that these entries are not to be rendered, pointer 310 is set equal to pointer 320. By setting the pointer 310 equal to the prior pointer 320, the locations 311–318 between pointers 310 and 320 become available for writing. That is, the entries at location 311 through 318 are effectively removed from the buffer 130, because they will not be processed by the graphics engine 50, and will be written over by any subsequent data or command entries. Thus, the pointer 310 acts as a pointer to data that may be removed from the buffer 130, whereas the pointer 320 points to data that is determined to be non-removable until it is processed by the graphics engine 50. By maintaining separate pointers to removable and non-removable data, a separate buffer area is not required for holding processed vertex data and rendering commands while it is being determined whether they are to be submitted to the graphics engine 50.

Figure 4:
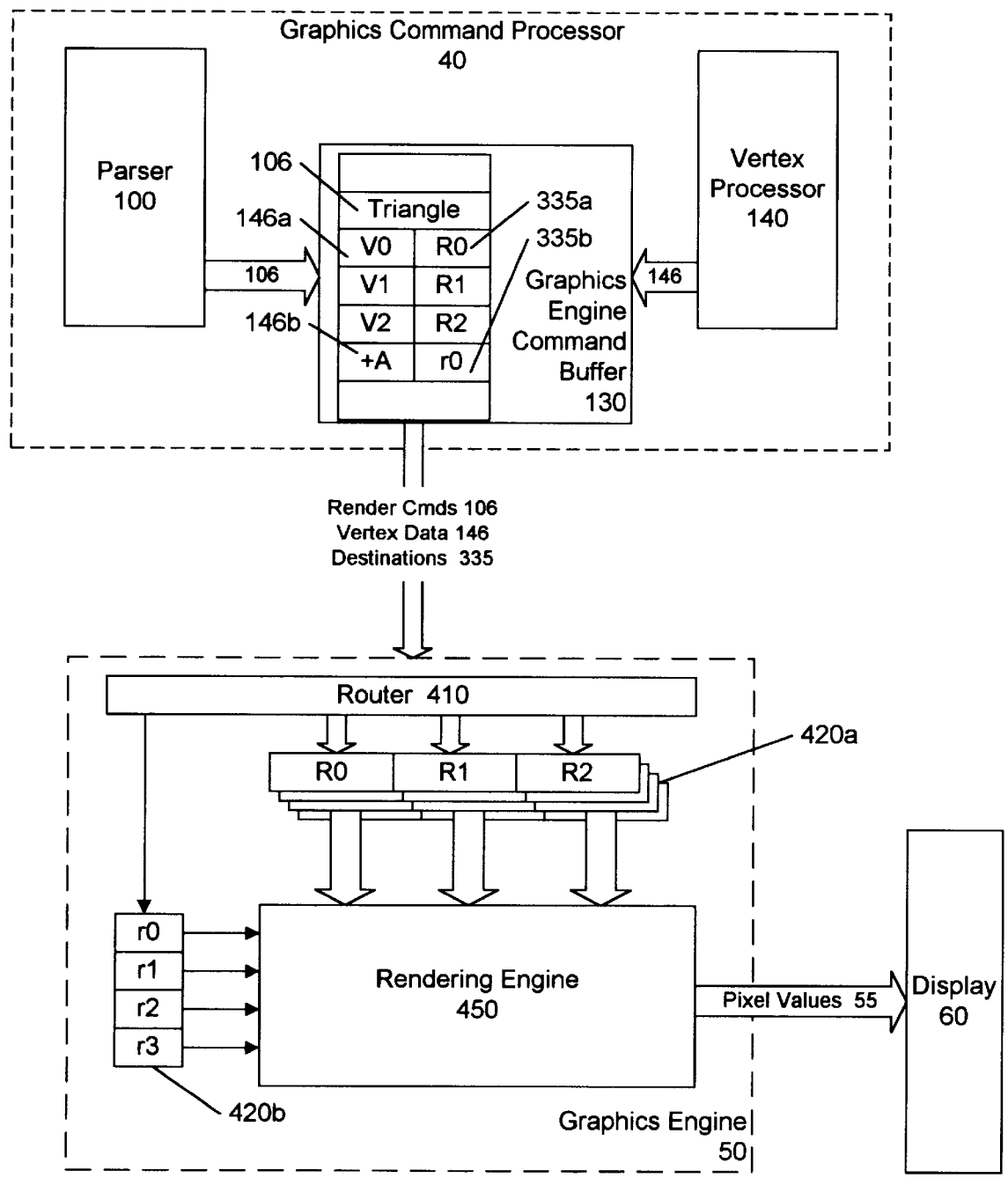
FIG. 4 illustrates a block diagram of an embodiment of a graphics engine in accordance with this invention.

The graphics engine 50 is, in general, a special purpose processor that is optimized to efficiently produce display values for each pixel being rendered, with minimal processing overhead. FIG. 4 illustrates a graphics engine 50 and the corresponding graphics engine command buffer 130 in accordance with one aspect of this invention. The graphics engine 50 includes a command and data router 410 for routing commands and data to sets of registers 420a, 420b, and a rendering engine 450 that processes the render commands 106 and vertex data 146 to produce pixel values 55 for display on a display 60. Typically, the vertex data 146 consists of multiple data elements, such as the location (X,Y,Z) of the vertex, the red-green-blue (RGB) color component values at the vertex, as well as opacity, specular and texture information, and other rendering information. As shown in FIG. 4, registers 420a are multiple data element registers, to accommodate the multiple data elements associated with each vertex. Each multiple data element register is identified by a single register indicator R0, R1, and R3. The graphics engine 50 also includes registers 420b, identified as r0, r1, r2, and r3 that each contain single data elements. The registers 420b are used to contain such vertex data as the area of the object to be rendered. Each vertex data 146 that is stored in the graphics engine command buffer 130 has an associated destination identifier 335. The multiple data element vertex data, identified as 146a in FIG. 4, has an associated multiple data element destination identifier 335a, and each single data element vertex data, identified as 146b, has a destination identifier 335b.

The vertex data 146a and 146b and their associated destinations 335a and 335b are provided to the router 410, which routes each data element to the identified destination register. In the example shown in FIG. 4, the value +A will be routed to register r0; the multiple data element vertex data V2 will be routed to multiple data element register R2, vertex data V1 to register R1, and vertex data V0 to register R0. Upon receipt of a render command 106, the rendering engine 450 performs the command, using the data that has been located in the registers 420a and 420b as required, to produce pixel values 55 for display on the display 60. By identifying the destinations 335 for the vertex data 146, the graphics engine 50 can devote most of its processing time to the rendering of pixel values, rather than being burdened by the overhead associated with parsing and data destination determination. Similarly, the CPU 10 need not be burdened by the details of the graphics engine 50, such as its particular register configuration, to effect the rendering of an image.

The identification of destinations 335 for each vertex data 146 also allows for the optimization of the transfer of data for related image objects. FIG. 5A illustrates the rendering of a strip of triangles T1, T2, . . . T5. As shown, each of the triangles T1, T2, . . . T5 have vertices V0, V1, . . . V6 in common with one another. Triangle T1 is formed by vertices V0, V1, and V2. Triangle T2 is formed by vertices V1, V2, and V3, having vertices V1 and V2 in common with triangle T1. Because the graphics command processor 40 identifies the destination 335 of the vertex data 146 in the graphics engine command buffer 130, the graphics command processor 40 can provide data to the graphics engine 50 so as to reuse the common vertex information. As shown in FIG. 5B, triangle T1 uses registers R0, R1, and R2 to contain vertex data V0, V1, and V2, respectively. Triangle T2, which also includes vertices V1 and V2, can use register R0 to contain the non-common vertex data V3. Because the vertex data V1 and V2 has been routed to registers R1 and R2, and the vertex data V3 is subsequently routed to register R0, all the information that is required for rendering triangle T2 will be in registers R0, R1, and R2, without having to repeat the transfer of vertex data V1 and V2.

The contents of the graphics engine command buffer 130 in this example are shown in FIG. 5C. When the triangle rendering command 510, corresponding to triangle T1, is provided to the graphics engine 50, the vertex data V0, V1, and V2 will be processed to produce the pixel values associated with triangle T1. Thereafter, at 515, vertex data V3 will be routed to register R0. When the triangle rendering command 520, corresponding to triangle T2, is provided to the graphics engine 50 the vertex data V3, V1, and V2 will be processed to produce the pixel values associated with triangle T2. Similarly, each subsequent triangle T3, T4, T5 need only replace the contents of one register (R1, R2, R0 with V4, V5, V6, respectively) to effect the rendering based on previously provided vertex data, as shown in FIGS. 5B and 5C. Because the vertex data V0 . . . V6 includes multiple data elements per vertex, the avoidance of transferring of vertex data for each vertex can provide for a significant savings in latency and data transfer requirements.

Illustrated in FIGS. 5B and 5C are vertex parameters +A and −A. As discussed above, in 3-D rendering, the orientation (away from or toward a viewer) can determine the visibility of an object, or portions of an object. The orientation of a surface can be defined with respect to the order of the vertices forming the surface. Vertices which are arranged in, for example, a counter-clockwise order (V0–V1–V2) define a surface (T1) having one orientation; when this same surface (T1) is viewed from "behind", these same vertices (V0–V1–V2) will appear to be arranged in a clockwise order. As is common in the art, the orientation of a surface is determined by the cross product of vectors, the sign of the cross product being dependent upon the order of forming the cross product. Associated with such cross product determinations is a computation of the area of the surface. To optimize the rendering process, the area of each triangle is computed by the vertex processor 140, via the processing unit 150 of FIG. 1, and provided directly to the graphics engine 50.

In the aforementioned replacement of a single vertex to optimize the data transfer associated with related data objects, such a replacement may affect the determination of the orientation of the surface by the graphics engine 50. Consider, for example, the rendering of triangles T1, T2, . . . T5 of FIG. 5A, each of which triangles are oriented in the same direction. Assume that the graphics engine determines orientation by the order of the vertices in registers R0–R1–R2 respectively. Following this ordering, triangle T1 is processed in the order V0–V1–V2, as in FIG. 5B, which corresponds to a counterclockwise sequence of vertices. Conversely, triangle T2 is processed in the order V3(R0)–V1(R1)–V2(R2), which corresponds to a clockwise sequence of vertices. Triangle T3 is processed in the order V3–V4–V2, a counterclockwise sequence. Triangle T4 is processed in the order V3–V4–V5, a clockwise sequence. Triangle T5 is processed in the order V6–V4–V5, a counterclockwise sequence. With these alternating sequences, the graphics engine will determine that every other triangle faces away from the viewpoint, and will not render it. To eliminate the alternating orientation caused by the use of common vertices, the algebraic sign of the area that is communicated to the graphics engine 50 by the vector processor 140 is alternated, as shown by the plus (+) and minus (−) signs associated with register r0 in FIGS. 5B and 5C. That is, in FIG. 5C, a positive area +A is placed in the graphics engine command buffer, at 501, corresponding to triangle T1; a negative area −A is place in the graphics engine command buffer, at 501, corresponding to triangle T2. In this manner, because the graphics engine 5O uses the area provided by the graphics command processor 40 to determine the orientation of each surface, each of the triangles will be determined to have the same orientation, and rendered appropriately.

The pattern of triangles of FIG. 5A is termed a "strip" of triangles, wherein each triangle has two vertices in common with another triangle. The vertex processor 140 may contain the processing required to determine when such strips occur, to optimize the data transfer to the graphics engine 50. Alternatively, one type of application command 32 is provided, termed a "strip" command, that directs the rendering of a strip of triangles. In this manner, the CPU 10 is relieved of the task of specifying the details of each triangle to be rendered; the CPU 10 need only communicate the strip command, an index to the first vertex in the strip, and the number of vertices forming the strip.

FIG. 6A illustrates another pattern of triangles, termed a "fan" of triangles. A fan of triangles has one vertex V0 that is common to all the triangles T1, T2, . . . T5 in the fan. In accordance with this invention, another type of application command 32, a "fan" command, is provided which allows the CPU 10 to specify the rendering of a fan of triangles. FIG. 6B illustrates the loading of the registers R0, R1, R2 and r0 to effect the rendering of the fan of FIG. 6A with minimal data transfer overhead. FIG. 6C illustrates the contents of the graphics engine command buffer 130 to effect this optimized rendering for the fan of triangles illustrated in FIG. 6A, using the same principles as discussed with reference to FIGS. 5A–5C.

Thus it is seen that, by providing a graphics command processor 40 that offloads the task of formulating detailed rendering commands from a CPU 10, the processing of graphics data can be effected with minimal latency, and with optimizations that improve the graphics engine efficiency and minimizes the data transfer overhead. As would be evident to one of ordinary skill in the art, a number of similar optimization techniques can be effected using the techniques and principles presented herein. Also evident, the techniques and principles presented herein may be implemented in hardware, software, or a combination of both. For example, the vertex walker 146 may be a sequence of program commands in a local memory that are processed by the vertex processor 140, whereas the data requester 142 may be a hardware state machine that generates data requests in response to a particular command contained in the vertex parameters 102. These and other techniques will be evident to one of ordinary skill in the art, and, although not explicitly detailed herein, are within the spirit and scope of this invention.

What is claimed is:

1. A graphics command processor comprising:
   a parser that receives first application commands from a memory and produces therefrom first vertex attributes and rendering commands, and
   a vertex processor, operably coupled to the parser, that processes the first vertex attributes to produce processed vertex data, wherein
      the vertex processor includes a data requester that requests a transfer of raw vertex data from the memory based on the first vertex attributes, the memory having a latency time,
   a buffer that is dynamically partitioned, based on the latency time, to include a first logical buffer to store the first and second application commands and a second logical buffer to store the raw vertex data,
   wherein the parser receives second application commands from the memory to produce second vertex attributes while the vertex processor is processing the first vertex attributes.

2. The graphics command processor of claim 1, wherein the vertex processor includes:
   a vertex walker that processes the raw vertex data from the buffer to produce the processed vertex data, and
   wherein the vertex processor processes at least one data element of a plurality of data elements in the raw vertex data to produce the processed vertex data.

3. The graphics command processor of claim 1, further including:
   a buffer that stores the processed vertex data, wherein the processed vertex data includes removable vertex elements and nonremovable vertex elements, and wherein the vertex processor removes the removable vertex elements in dependence upon a determination of an orientation of a surface corresponding to the first vertex attribute.

4. The graphics command processor of claim 3, wherein the buffer is a FIFO, and the vertex processor uses a first pointer that indexes the removable vertex elements in the buffer, and a second pointer that indexes the nonremovable vertex elements in the buffer.

5. The graphics command processor of claim 1, further including
   a buffer that stores the processed vertex data and the rendering commands for communication with a graphics engine, the graphics engine having a fixed configuration of registers each having a register address, and wherein the vertex processor also stores the register address associated with the processed vertex data.

6. The graphics command processor of claim 5, wherein:
   the rendering commands include a first rendering command and a second rendering command, and
   the processed vertex data includes a plurality of first vertex elements that are associated with the first rendering command, and at least one second vertex element that is associated with the second rendering command,
   wherein at least one of the plurality of first vertex elements is associated with the second rendering command.

7. The graphics command processor of claim 6, wherein:
   the first and second rendering commands are commands that each render a triangle having three vertex elements, and the three vertex elements of the second rendering command include two of the three vertex elements of the first rendering command.

8. The graphics command processor of claim 1, wherein the vertex processor receives raw vertex data based on the first vertex attributes, the raw vertex data including a plurality of raw data elements, and
   the graphics command processor further including
      a processing unit, operably coupled to the vertex processor, that processes at least one raw data element of the plurality of data elements to produce at least one processed data element, and wherein
   the vertex processor produces the processed vertex data based on the at least one processed data element.

9. The graphics command processor of claim 8, wherein the first application commands include a format command, and the processing unit processes the at least one raw vertex parameter based on the format command.

10. A computer graphics system comprising:
    an interface to a CPU and a memory, wherein the CPU executes an application program that generates raw vertex data and application commands that are stored in the memory,
    a graphics command processor, operably coupled to the memory, that processes the application commands to render images based on the raw vertex data, the graphics command processor including:
       a fetcher, operably coupled to the memory, that transfers requested data from the memory to a buffer,
       a parser, operably coupled to the memory, that receives the application commands from the memory and produces vertex attributes and rendering commands, and
       a vertex processor, operably coupled to the parser, the fetcher, and the buffer, that processes the vertex attributes to provide data requests to the fetcher, causing the fetcher to transfer the raw vertex data from the memory to the buffer, and the vertex processor processes the raw vertex data in the buffer to produce processed vertex data, and
       a graphics engine that renders images based on the processed vertex data and the rendering commands
    wherein the data requests include a first set of addresses and a second set of addresses, and
    the vertex processor includes:
       a data requester that provides the first set of addresses to the fetcher,
       a data processor that processes a first set of raw vertex data in the buffer corresponding to the first set of addresses, and wherein
       the data requester provides the second set of addresses to the fetcher while the data processor is processing the first set of raw vertex data.

11. The computer graphics system of claim 10, wherein at least one of the application commands is a triangle set command, and the rendering commands corresponding to the triangle set command include a first triangle command and a plurality of subsequent triangle commands, and wherein the processed vertex data includes a plurality of vertex elements, each vertex element of the plurality of vertex elements corresponding to a vertex of a triangle, the first triangle command is associated with three vertex elements of the plurality of vertex elements, and each subsequent triangle command is associated with at least one vertex elements that is associated with a preceding triangle command.

12. The computer graphics system of claim 10, wherein the graphics command processor also includes a processing unit, operably coupled to the vertex processor, that processes at least one data element of a plurality of data elements in the raw vertex data to produce the processed vertex data.

13. A method for rendering graphic images, comprising the steps of:

parsing a first application command to produce first vertex attributes, processing the first vertex attributes to produce processed vertex data by receiving raw vertex data based on the first vertex attributes, and processing the raw vertex data to produce the processed vertex data, and parsing a second application command to produce second vertex attributes coincident with the processing of the first vertex attributes, requesting a transfer of raw vertex data from a memory based on the first vertex attributes and storing the first and second application commands and storing the raw vertex data in a buffer.

14. The method of claim 13, further including the step of processing the first application commands to produce rendering commands.

15. A method for rendering graphic images, comprising the steps of:

parsing a first application command to produce first vertex attributes, processing the first vertex attributes to produce processed vertex data by receiving raw vertex data based on the first vertex attributes, and processing the raw vertex data to produce the processed vertex data, and parsing a second application command to produce second vertex attributes coincident with the processing of the first vertex attributes, requesting a transfer of raw vertex data from a memory having a latency time based on the first vertex attributes dynamically partitioning a buffer based on the latency time; and storing the first and second application commands and storing the raw vertex data in the buffer.

16. The method of claim 15, wherein the the rendering commands include a first rendering command and a second rendering command, and the processed vertex data includes a plurality of first vertex elements that are associated with the first rendering command, and at least one second vertex element that is associated with the second rendering command, wherein at least one of the plurality of first vertex elements is associated with the second rendering command.

17. The method of claim 15, wherein the step of processing the first vertex attributes includes:

receiving raw vertex data that includes a plurality of data elements, and reformatting at least one data element of the plurality of data elements in the raw vertex data to produce the processed vertex data.

\* \* \* \* \*